US012784408B2

(12) United States Patent
Xiong et al.

(10) Patent No.: US 12,784,408 B2
(45) Date of Patent: Nov. 3, 2026

(54) DETERMINING VIEW-DEPENDENT COLOR VALUES FOR IMAGE PIXELS IN REAL TIME

(71) Applicant: Samsung Electronics Co., Ltd., Suwon-si (KR)

(72) Inventors: Enxing Xiong, San Jose, CA (US); Michael Blix, Sunnyvale, CA (US); Laszlo Gombos, Winchester, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 18/743,645

(22) Filed: Jun. 14, 2024

(65) Prior Publication Data

US 2025/0069370 A1 Feb. 27, 2025

Related U.S. Application Data

(60) Provisional application No. 63/534,505, filed on Aug. 24, 2023.

(51) Int. Cl.
*G06V 10/771* (2022.01)
*G06T 7/70* (2017.01)
(Continued)

(52) U.S. Cl.
CPC .............. *G06V 10/771* (2022.01); *G06T 7/70* (2017.01); *G06T 7/90* (2017.01); *G06V 10/56* (2022.01);
(Continued)

(58) Field of Classification Search
None
See application file for complete search history.

(56) References Cited

U.S. PATENT DOCUMENTS 11,748,940 B1 * 9/2023 Xian .................... G06T 15/205 345/419
2021/0134013 A1 * 5/2021 Carlsson .............. H04N 13/246
2022/0201055 A1 6/2022 Hinds

FOREIGN PATENT DOCUMENTS

CN 113822977 A 12/2021
CN 115439606 A 12/2022
(Continued)

OTHER PUBLICATIONS

B. Yu et al ("pixelnerf: Neural radiance fields from one or few images." Proceedings of the IEEE/CVF conference on computer vision and pattern recognition. 2021) (Year: 2021).*
(Continued)

*Primary Examiner* — Leon Viet Q Nguyen

(57) ABSTRACT

In one embodiment, a method includes determining a first camera pose and a second camera pose. The method includes accessing, for a first frame, a first feature map that includes a feature vector for each pixel in the first frame and determining, by a NeRF model and based on the first feature map and the first pose, a first color value for each first-frame pixel The method further includes accessing a second feature map for a second frame, determining (1) a feature-map difference between the first and second feature maps and (2) a pose difference between the first and second poses, and determining a second color value for each pixel in the second frame by modifying the first color value of a corresponding pixel in the first frame with an output of a trained residue neural network, the output based on (1) the feature-map difference and (2) the pose difference.

20 Claims, 4 Drawing Sheets

(51) Int. Cl.
*G06T 7/90* (2017.01)
*G06V 10/56* (2022.01)

(52) U.S. Cl.
CPC ............... *G06T 2207/10024* (2013.01); *G06T 2207/20084* (2013.01)

(56) References Cited

FOREIGN PATENT DOCUMENTS

| | | | |
|---|---|---|---|
| CN | 115909015 | B | 5/2023 |
| CN | 116452758 | A | 7/2023 |
| CN | 116612256 | A | 8/2023 |

OTHER PUBLICATIONS

Al ("Baking neural radiance fields for real-time view synthesis." Proceedings of the IEEE/CVF international conference on computer vision. 2021) (Year: 2021).*

* cited by examiner

DETERMINING VIEW-DEPENDENT COLOR VALUES FOR IMAGE PIXELS IN REAL TIME

PRIORITY CLAIM

This application claims the benefit under 35 U.S.C. § 119 of U.S. Provisional Patent Application No. 63/534,505 filed Aug. 24, 2023, which is incorporated by reference herein.

TECHNICAL FIELD

This application generally relates to determining view-dependent color values for image pixels in real time.

BACKGROUND

A neural radiance field (NeRF) uses deep learning to reconstruct three-dimensional representations of a scene from sparse two-dimensional images of the scene.

As a person moves about a real or virtual scene, the scene's appearance (e.g., scene geometry, radiance, colors, etc.) changes as the user's perspective of scene changes. A set of images of a real or virtual scene only contains the appearance information of the scene from the particular camera perspectives used to capture each image in the set. As a result, views of a scene from a perspective that does not correspond to an existing image are not immediately available, as no image corresponds to the view of the scene from that perspective. However, a NeRF model can predict scene views from viewpoints that don't exist in an image dataset, for example by learning scene geometry from the dataset of images. For instance, a NeRF model may predict a volume density and view-dependent emitted radiance for various scene perspectives given the spatial location (x, y, z) and viewing direction in Euler angles (θ, Φ) of the camera as used to capture each image in the dataset.

DESCRIPTION OF EXAMPLE EMBODIMENTS

While NeRF models are currently one of the best ways to reconstruct a scene with photo-realistic appearance from a dataset of images of the scene, rendering new frames corresponding to new perspectives (i.e., frames corresponding to perspectives that don't exist in the image dataset) is a computationally intensive task. For example, using a NeRF model to render a frame from a new perspective can take several seconds. Video frame rates for rendering scenes using a NeRF model are less than 30 frames per second (FPS) for real-world scenes, especially for head-worn stereoscopic headsets (e.g., extended reality (XR) headsets) because such headsets typically have less computational power than even mobile devices (e.g., smartphones), and in addition, two frames need to be concurrently generated by the headset: one frame to present to the left eye and one from to present to the right eye, which when viewed together create a three-dimensional perspective of the scene.

Relatively low frame rates reduce viewing quality and, particularly for stereoscopic head-worn devices, can induce discomfort in viewers, such as by causing headaches or nausea. For example, low or changing frame rate can degrade the viewing experience, reduce the feeling of immersion when viewing an XR video, and cause discomfort to the user.

Figure 1:
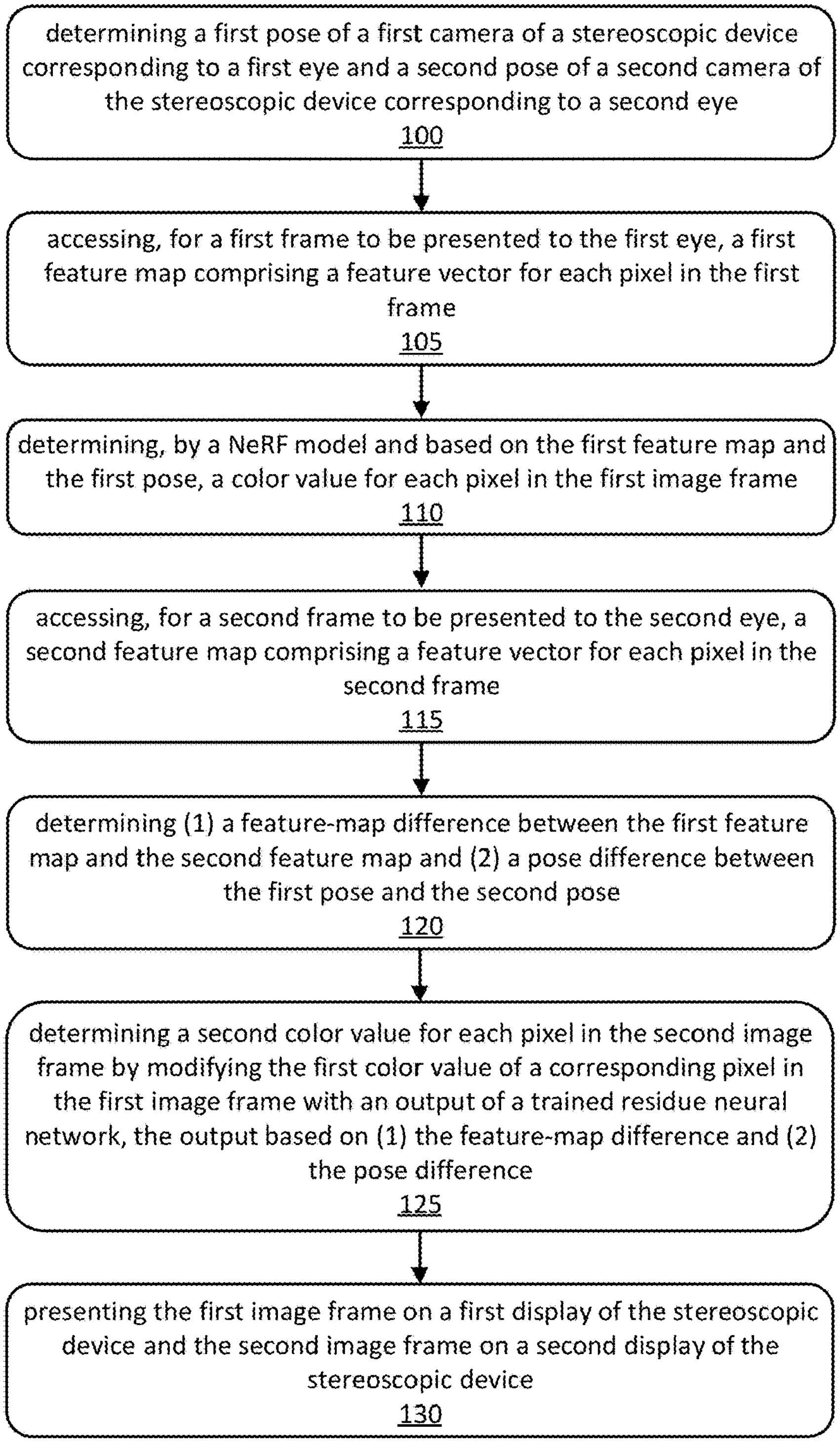
FIG. 1 illustrates an example method using a NeRF model that can provide real-time rendering at improved frame rates.

FIG. 1 illustrates an example method for using a NeRF model that can provide real-time rendering at vastly improved frame rates. For example, embodiments of the method of FIG. 1 can render new views of a scene in real time at rates greater than 40 FPS on a stereoscopic head-worn device.

Step 100 of the example method of FIG. 1 includes determining a first pose of a first camera of a stereoscopic device corresponding to a first eye and a second pose of a second camera of the stereoscopic device corresponding to a second eye. For instance, the stereoscopic device may be a head-worn device, such as a head-mounted device or a pair of glasses.

The device may include at least one pair of stereoscopic cameras. In general, each camera's pose identifies the perspective of that camera in the context of the scene (whether real, virtual, or any mix of the two) being displayed on the stereoscopic device. The camera may or may not actually capture images in the real, physical environment of the user, and the scene may correspond to the user's current, actual physical environment or to a different real environment (e.g., to a scene physically and/or temporally remote from the user). The scene may include a mix of real and VR content (e.g., as in augmented reality), or may include only virtual content.

As described above, in the context of the example method of FIG. 1, a camera's pose defines the perspective of that camera for the scene displayed on the stereoscopic device. For a stereoscopic pair of cameras, with each camera corresponding to one of the user's eyes, each camera's pose corresponds to the perspective of one of the user's eyes viewing the scene. The scene may be represented by previously captured images of the scene. For example, a user may take several two-dimensional images of a scene, such as a historic bridge, from different perspectives. A user subsequently wishing to view the historic bridge would normally be limited to the actual images and corresponding views of the bridge, i.e., the user would not be able to move around the scene and freely view the bridge from perspectives that are not contained in the set of images. However, a NeRF model may generate views of the bridge from perspectives other than those represented by the actual images of the bridge, and therefore a user can view the bridge from a variety of different perspectives, as if the user were physically at the bridge. But as explained above, such renderings occur at a relatively low frame rate, and can even take several seconds to generate. However, the techniques disclosed herein substantially increase the frame rate of this rendering process, specifically during the portion of the process that determines the appropriate color values of the pixels in rendered images.

Step 105 of the example method of FIG. 1 includes accessing, for a first frame to be presented to the first eye, a first feature map comprising a feature vector for each pixel in the first frame. The first frame is an image frame of a scene that is or will be displayed on the stereoscopic device. For each pixel in the first frame, there is an n-dimensional feature vector specifying n features of the image content in that pixel for that particular frame. For example, n may be 16, 8, or any suitable number, and in general, the informational content in the feature vector will increase as n increases, but the processing time and computational resources for any process using the feature vector will also increase as n increases.

The feature map and feature vectors may be obtained from a portion of a NeRF model. For example, starting from an initial grid mesh, the specific values of the n features for a particular pixel may be determined by a neural-network portion of the NeRF model that is trained to output features from an input pixel. In particular embodiments, a NeRF model may include a number of function-specific neural networks, such as a feature-defining neural network, an opacity-defining neural network (which outputs the opacity of each pixel), and a color-defining neural network, which specifies the color values (e.g., RGB color values) for each pixel. This disclosure primarily focuses on the portion of the rendering process that defines the color values for each pixel.

Step 110 of the example method of FIG. 1 includes determining, by a NeRF model and based on the first feature map and the first pose, a color value for each pixel in the first image frame. As discussed herein, a NeRF model is used to generate aspects of the image content from a perspective that is not already represented in the image dataset of the scene, and a subportion of the NeRF model may be dedicated to determining color values for each pixel in frame. As described above, the first camera pose identifies the viewing perspective of the first eye relative to the scene.

Figure 2:
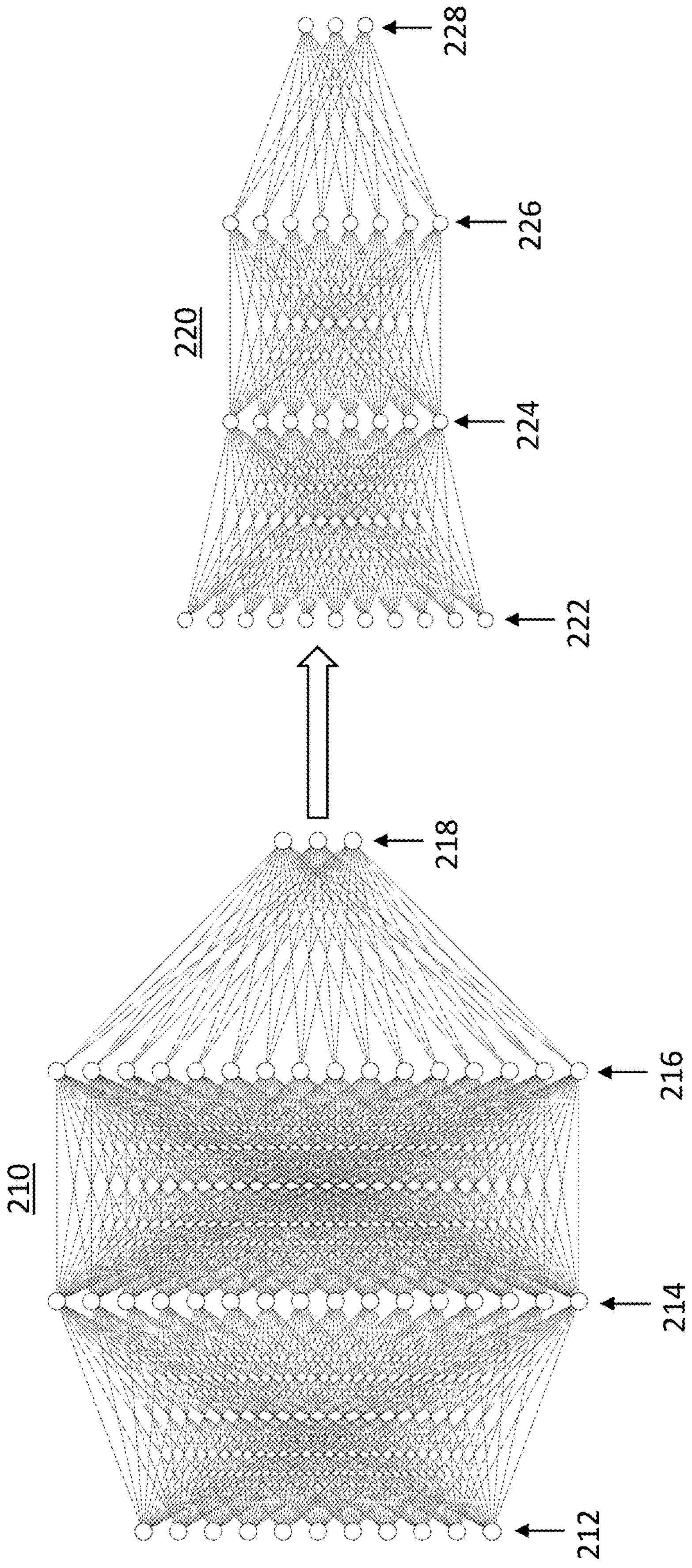
FIG. 2 illustrates an example NeRF network architecture for defining the color values of pixels.

The portion of the NeRF model used to define the color values for each pixel is a neural-network architecture that typically includes an input layer, one or more hidden layers, and an output layer. An example NeRF network architecture 210 for defining the color values of pixels is illustrated in FIG. 2. Example NeRF network architecture 210 has an 11-dimensional input layer 212 corresponding to the input of an 11-dimensional vector: here, 8 dimensions corresponding to an 8-dimensional feature vector, and 3 dimensions defining the camera direction, which is discussed in more detail below. Example NeRF network architecture 210 includes two fully connected MLP (multilayer perceptron) hidden layers 214 and 216 of 16 dimensions each. Output layer 218 of example NeRF architecture 210 is a 3-dimensional output: each dimension corresponding to one of the R, G, or B color values for particular dimension. While examples of this disclosure discuss color values in the RGB format, this disclosure contemplates that any suitable format for defining color values may be used.

In particular embodiments, the NeRF model used to determine color values for pixels in the first image frame may be a lightweight model that is trained by a larger NeRF model. For instance, FIG. 2 illustrates an example NeRF architecture 220 for defining the color values of pixels. Example NeRF architecture 220 has an 11-dimensional input layer 222 and a three-dimensional output layer 228, which is the same size as for the corresponding input and output layers of NeRF architecture 210. However, example NeRF architecture 220 is smaller than example NeRF architecture 210: architecture 220 includes two fully connected MLP hidden layers 224 and 226 of only 8 dimensions each, thereby greatly reducing the number of parameters (e.g., from over 500 parameters in architecture 210 to around 190 parameters in architecture 220) defining the architecture used in pixel-color predictions. This disclosure contemplates that more hidden layers than shown in example architecture 220 may be used, in particular embodiments, and further that in particular embodiments a lightweight NeRF architecture for predicting color values may have hidden layers that have more or fewer than 8 dimensions. However, a two-hidden-layer architecture having 8 dimensions each may represent a good trade-off between parameter reduction (and therefore rendering computation time) compared to the full NeRF architecture 210 while still providing good visual results.

A larger NeRF model (e.g., architecture 210) may be used to train a lightweight NeRF model (e.g., architecture 220). For instance, a larger NeRF model may be trained to predict the three-dimensional color values for each pixel $C_{ij}$ in a frame, where the indices i and j identify the specific pixel within the frame. The input to the color-defining portion of the NeRF model is an n dimensional feature vector $F_n$ and m dimensional camera-pose vector $P_m$, which defines the perspective of the camera relative to the scene. For example, if n is 8 and m is 3, then the color-prediction output $$C_{ij}^{orig}$$

of a trained, larger NeRF model may be defined as:

$$C_{ij}^{orig} := C_{ij}^{orig}\left(\overrightarrow{P_3}, \overrightarrow{F_8}\right) = C_{ij}^{orig}(x_1, x_2, x_{11}), \text{ where } \overrightarrow{F_8} = (f_1, f_2, \ldots, f_8), \quad \overrightarrow{P_3} = (p_x, p_y, p_z), \; p_x^2 + p_y^2 + p_z^2 = 1 \tag{1}$$

where the condition $$p_x^2 + p_y^2 + p_z^2 = 1$$

defines the camera-pose coordinates with respect to the unit sphere. As identified in Eq. 1, the n-dimensional feature vector and the m-dimensional camera-pose vector may be combined into an n+m-dimensional input vector having dimensions $x_1, x_2, \ldots, x_{n+m}$. While this examples defines the camera-pose vector as a 3-dimensional vector in Cartesian coordinates and subject to the constraint $$p_x^2 + p_y^2 + p_z^2 = 1,$$

this disclosure contemplates that any suitable representation may be used (e.g., a 2-dimensional vector defined by θ, Φ in spherical coordinates, with r=1).

To train a lightweight NeRF model (e.g., architecture 220) for color prediction, the values $$C_{ij}^{orig}$$

for an input frame may be used as ground-truth data. The input image is fed into the lightweight NeRF model, which predicts color values $$C_{ij}^{new}$$

for each pixel. For instance, in the example of Eq. 1, then $$C_{ij}^{new}$$

is:

$$C_{ij}^{new} := C_{ij}^{new}\left(\overrightarrow{P_3}, \overrightarrow{F_8}\right) = C_{ij}^{new}(x_1, x_2, \ldots, x_{11}), \tag{2}$$

and training may be performed by minimizing the loss function defined as:

$$\text{loss} := \left\| C_{ij}^{orig} - C_{ij}^{new} \right\| \tag{3}$$

Many input images may be used to train the lightweight architecture until a terminating condition is reached (e.g., the loss value reaches a sufficiently low threshold value, the loss value is changing less than a predetermined amount between iterations, a predetermined number of training iterations or training time has occurred, etc.). While the example of Eq. 2 contemplates an objective (loss) function using an $L_1$ norm, this disclosure contemplates that other norms or other objective functions (e.g., ones containing one or more regularization terms) may be used.

Figure 3:
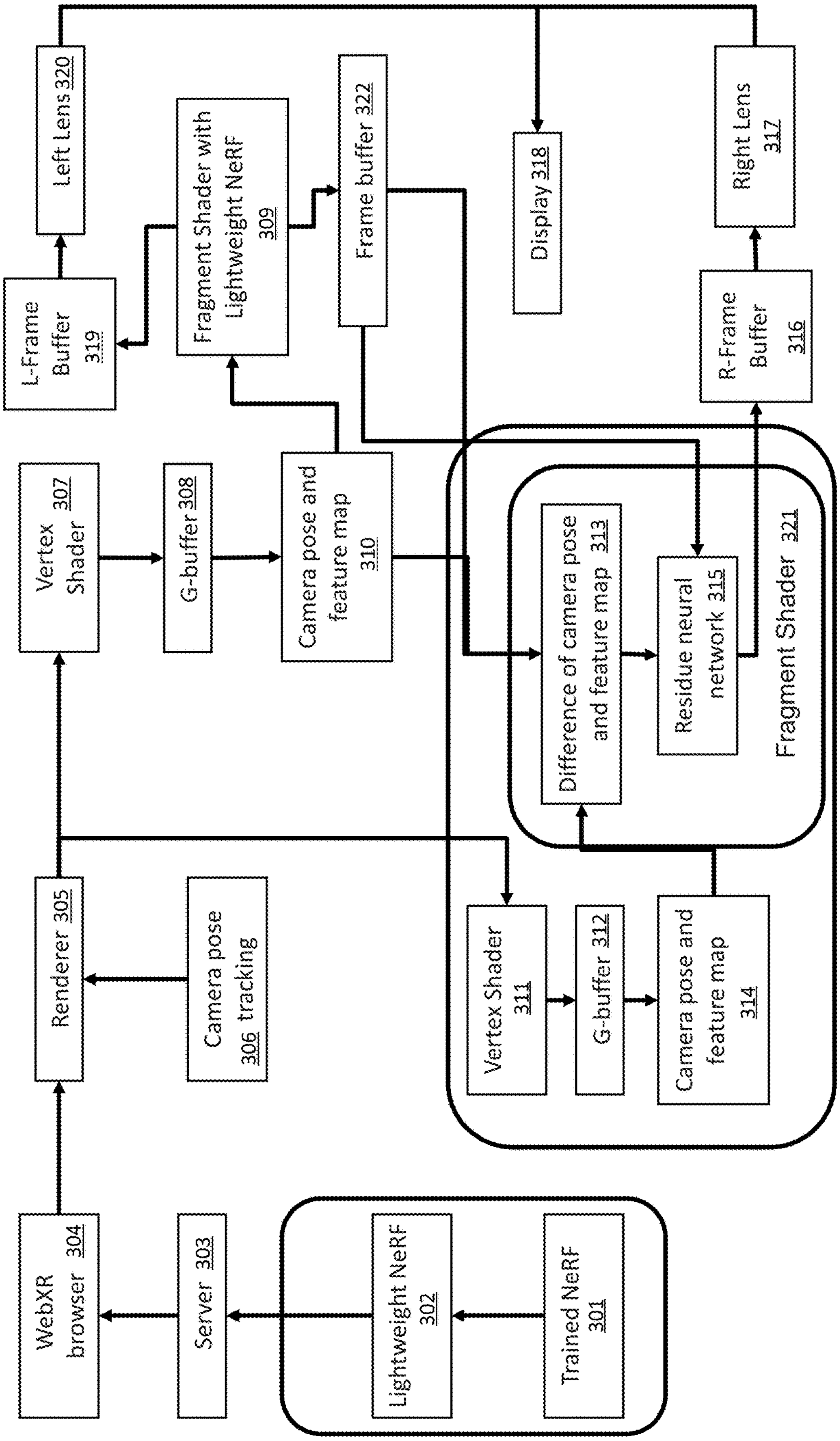
FIG. 3 illustrates a flowchart of an example runtime procedure for predicting the colors values of each pixel in a stereoscopic (left and right image) scene.

In embodiments that use a lightweight NeRF model to preform color prediction at runtime, then the lightweight NeRF model may be deployed onto end devices (e.g., onto the stereoscopic device discussed in the example method of FIG. 1) for use to predict color values during runtime (e.g., as a user moves about a scene). FIG. 3 illustrates a flowchart of an example runtime procedure for predicting the colors values of each pixel in a stereoscopic (left and right image) scene. As explained below, the procedure illustrated in the example of FIG. 3 improves framerates and reduces computational resources in two ways: (1) by using a lightweight model to predict the color values of pixels in a first frame, and (2) by using a residue neural network, rather than the NeRF model's neural network, to predict color values in the second frame, as described more fully in connection with step 125 of the example method of FIG. 1.

In the example of FIG. 3, a trained, full NeRF network 301 is used to train a lightweight neural network 302. The training process can occur on one or more computing devices. Once the lightweight neural network is trained, the trained lightweight network can be stored on a computing device, such as on server device 303, for deployment to client devices. For instance, in the example of FIG. 3, the lightweight model may be deployed to a WebXR browser 304 of a stereoscopic device that includes a pair of stereoscopic cameras (which, as described above, for the purposes of this disclose define the view perspective of the user wearing the stereoscopic device, and may not necessarily have image-taking functional).

In the example of FIG. 3, when a user is viewing a scene, then a renderer 305 obtains camera poses from real-time camera pose tracking 306 for a pair of (left, right) input image frames. In particular embodiments, renderer 305 may be implemented by three.js. The renderer passes the NeRF model to a vertex shader; in the example of FIG. 3, vertex shader 307 corresponds to the left (first) image frame, while vertex shader 311 corresponds to the second (right) image frame. Vertex shaders 307 and 311 may be the same shader, but distinguished in FIG. 3 by the functions it is performing for respective image frames. Each vertex shader determines aspects of the mesh (e.g., each vertex of a triangle mesh) for its frame, among other functions such as determining whether particular points in space are visible from the user's perspective (as defined by the camera poses) and cropping portions of the mesh that are not visible. In particular embodiments, the feature map (such as a uv-texture map) may be generated in connection with a vertex shader, e.g., by the corresponding neural networks of a NeRF model. Vertex and feature-map information is stored in G-buffers, such as G-buffers 308 and 312, which again may be the same buffers but referenced separately to distinguish the frame-specific functions being performed for respective stereoscopic image frames. In the example of FIG. 3, the camera pose and feature map information 310 for the first image is passed to a fragment shader 309, which uses the lightweight NeRF color-determining architecture described above to predict the output color values for each pixel in the first frame. The frame information is passed to L-frame buffer 319 for display to a user, and is also passed to frame buffer 322 for use in determining the color values for pixels in the second frame.

Step 115 of the example method of FIG. 1 includes accessing, for a second frame to be presented to the second eye, a second feature map comprising a feature vector for each pixel in the second frame. For example, with reference to the example of FIG. 3, the feature map and camera pose information 314 are accessed from G-buffer 312 and provided to fragment shader 321.

Step 120 of the example method of FIG. 1 includes determining (1) a feature-map difference between the first feature map and the second feature map and (2) a pose difference between the first pose and the second pose. Step 125 of the example method of FIG. 1 includes determining a second color value for each pixel in the second image frame by modifying the first color value of a corresponding pixel in the first image frame with an output of a trained residue neural network, the output based on (1) the feature-map difference and (2) the pose difference. For instance, in the example of FIG. 3, fragment shader 321 predicts color values for each pixel of the second frame using the differences 313 referenced in step 120 of the example method of FIG. 3 as input to residue neural network 315.

Residue neural network 315 may be a very lightweight neural network (even more so than the lightweight NeRF neural network described herein). For example, residue neural network 315 may have an n dimensional input layer (e.g., where n is equal to the number of feature-vector dimensions plus the number of camera-pose dimensions); two fully connected hidden layers each having, e.g., 4 dimensions; and a 3-dimensional output layer corresponding to the colors values predicted for a particular pixel. For instance, for a left-eye (first frame) color determination made in accordance with Eq. 1, then the color values for pixels in the right-eye (second frame) may be determined by:

$$C_{ij}^1 = C_{ij}^0 + \alpha \cdot \nabla C_{ij}^0 \cdot \overrightarrow{Dx}, \text{ where } \alpha \in (0, 1), \overrightarrow{Dx} = \left(\Delta\overrightarrow{P_3}, \Delta\overrightarrow{F_8}\right) \tag{4}$$

$$C_{ij}^1 = C_{ij}^0 + \alpha \cdot \left(\partial_l C_{ij}^0 \cdot \partial x_l\right) = C_{ij}^0 + \alpha\left(\sum\nolimits_{l=1}^{11} \partial_l C_{ij}^0 \cdot \partial x_l\right) := C_{ij}^0 + \alpha \cdot MLP(\overrightarrow{\nabla x}), \text{ where } \vec{x} = (x_1, x_2, x_{11}) \tag{5}$$

where $$C_{ij}^{0}$$

refers to color values of the first (e.g., left) frame and $$C_{ij}^{1}$$

refers to color values of the second (e.g., right) frame. Here, $\overrightarrow{Dx}$ is the difference in camera pose and feature-map vectors for a particular pixel (identified by the subscripts i,j) in the first frame and the second frame.

$$\nabla C_{ij}^{0}$$

is a complex and generally unknown function, and Eq. 5 therefore represents a·

$$\nabla C_{ij}^{0} \cdot \overrightarrow{Dx}$$

using a tensor product and Einstein sum:

$$\left(\sum_{l=1}^{11} \partial_l C_{ij}^{0} \cdot \partial x_l\right).$$

This representation is estimated by MLP($\overrightarrow{\nabla x}$), where MLP is the trained residue network. MLP takes as input ($\overrightarrow{\nabla x}$), which is vector representing the difference in feature maps and camera poses between first and second image frames for a particular pixel. ($\overrightarrow{\nabla x}$) has the dimensions of P plus F; e.g., in the example of Eq. 1, ($\overrightarrow{\nabla x}$) is an 11-dimensional input vector. $\alpha$ is a hyperparameter that determines the weight given to the output MLP($\overrightarrow{\nabla x}$), and as explained in Eq. 5, the estimated color values for a particular second-frame pixel $$C_{ij}^{1}$$

is the sum of the color value for the corresponding pixel $$C_{ij}^{0}$$

in the first frame (which is determined by a NeRF model) plus the term a·MLP($\overrightarrow{\nabla x}$). While the same NeRF model used to estimate the color values of pixels in the first frame can also be used to estimate color values for pixels in the second frame, the architecture of MLP is more lightweight than the architecture of the NeRF model—even than the lightweight NeRF model described above in connection with fragment shader 309—and therefore the color values for pixels of the second frame can be determined more quickly and using fewer computational resources when MLP is used, by leveraging the prior information $$C_{ij}^{0}$$

for pixels in the first frame. As a result, run-time performance is improved while rendering images, resulting in superior user experience and mitigating or entirely avoiding the negative health effects described above.

To train the residue network MLP, ground-truth color values for pixels in a pair of first and second frames are determined, e.g., by a full NeRF model or by a lightweight NeRF model. The MLP model is trained based on the loss function:

$$\text{loss} := \left\| C^1 - C^0 - \alpha \cdot MLP(\overrightarrow{\nabla x}) \right\| \tag{6}$$

Where $C^1$ and $C^0$ in Eq. 6 refers to the ground-truth values, and the loss function is based on sample pixels from those images. While Eq. 6 contemplates an objective (loss) function using an $L_1$ norm, this disclosure contemplates that other norms or other objective functions (e.g., ones containing one or more regularization terms) may be used.

Step 130 of the example method of FIG. 1 includes presenting the first image frame on a first display of the stereoscopic device and the second image frame on a second display of the stereoscopic device. For instance, with respect to the example of FIG. 3, color information for the right frame is output by fragment shader 321 to a right-frame buffer 316. The left frame and the right frame for a given scene are displayed on respective left-eye, right-eye displays 318 of the stereoscopic device, and the user may view these displays through a left lens 320 and a right lens 317, respectively. Each time the user's view of the scene changes, then new frames are generated and displayed in accordance with the processes described above.

Particular embodiments, such as the example of FIG. 3, use both a lightweight NeRF model (to determine the color values of pixels in a first frame) and an even lighter-weight residue neural network (to determined the color values of pixels in a second frame). Other embodiments may use only one of these models. For example, particular embodiments may use a lightweight NeRF model to predict the color values of both first and second stereoscopic frames, or to predict color values of a single frame (e.g., when providing a 2D display). As another example, particular embodiments may use the residue neural network to predict color values of a second frame when the color values of a first frame are predicted by a full NeRF model. These various architectures may depend on the computer capabilities of the device that renders the image frame(s), and using both a lightweight NeRF model and a residue neural network will provide the most savings in terms of computational resources during the color-estimation part of the rendering process.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 4:
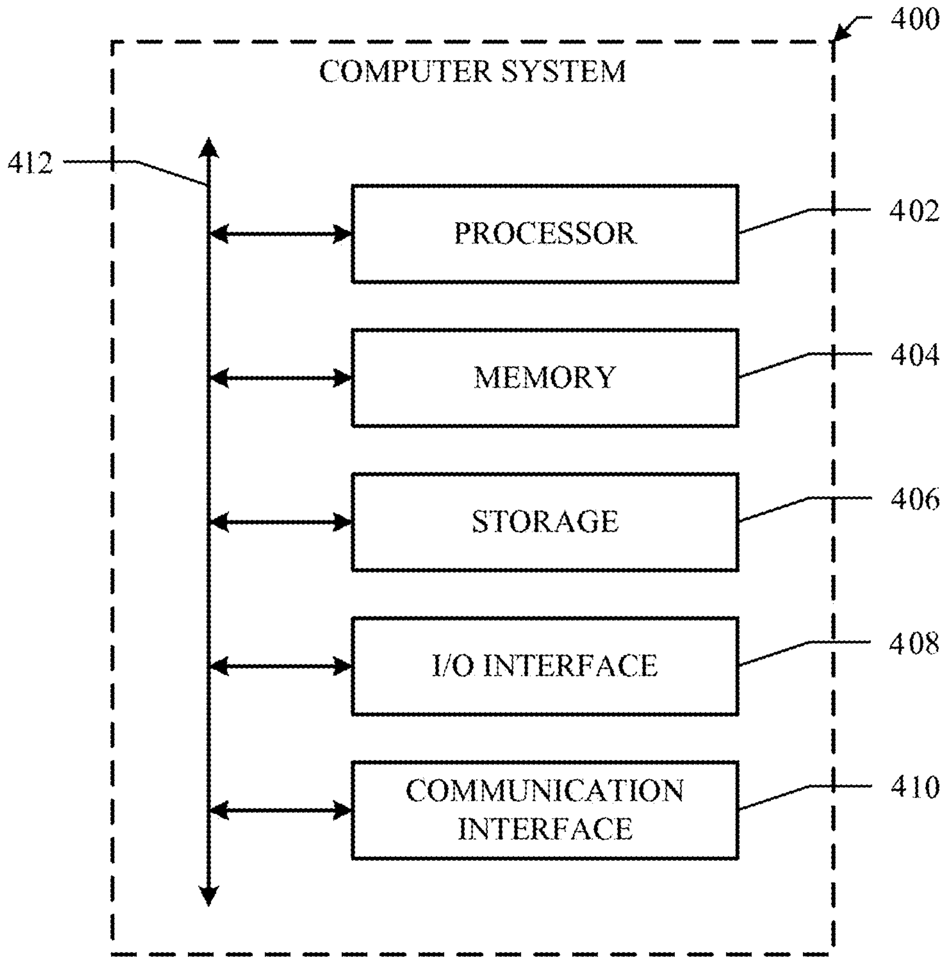
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these.

Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

determining a first pose of a first camera of a stereoscopic device corresponding to a first eye and a second pose of a second camera of the stereoscopic device corresponding to a second eye;

accessing, for a first frame to be presented to the first eye, a first feature map comprising a feature vector for each pixel in the first frame;

determining, by a neural radiance field (NeRF) model and based on the first feature map and the first pose, a first color value for each pixel in the first frame;

accessing, for a second frame to be presented to the second eye, a second feature map comprising a feature vector for each pixel in the second frame;

determining (1) a feature-map difference between the first feature map and the second feature map and (2) a pose difference between the first pose and the second pose;

determining a second color value for each pixel in the second frame by modifying the first color value of a corresponding pixel in the first frame with an output of a trained residue neural network, the output based on (1) the feature-map difference and (2) the pose difference; and presenting the first frame on a first display of the stereoscopic device and the second frame on a second display of the stereoscopic device.

2. The method of claim 1, wherein the stereoscopic device comprises a head-worn device.

3. The method of claim 1, wherein the NeRF model comprises a lightweight NeRF model trained by a larger, trained NeRF model.

4. The method of claim 3, wherein the lightweight NeRF model and the larger NeRF model each comprise a neural network, and wherein a number of parameters of one or more hidden layers of the lightweight NeRF model is less than a number of parameters of one or more hidden layers of the larger NeRF model.

5. The method of claim 4, wherein each hidden layer of the lightweight NeRF model comprises an 8-dimensional hidden layer.

6. The method of claim 4, wherein (1) a dimension of an input layer of the lightweight NeRF model is the same as a dimension of an input layer of the larger NeRF model, and (2) a dimension of an output layer of the lightweight NeRF model is the same as a dimension of an output layer of the larger NeRF model.

7. The method of claim 4, wherein the lightweight NeRF model is trained by minimizing a loss function that is based on a difference between, for each of a plurality of pixels in each ground-truth image in a training set of images, a color value of that pixel predicted by the lightweight NeRF model and a color value of that pixel predicted by the larger, trained NeRF model.

8. The method of claim 4, wherein a number of parameters of one or more hidden layers of the residue neural network is less than the number of parameters of one or more hidden layers of the lightweight NeRF model.

9. The method of claim 1, wherein the residue neural network comprises a plurality of hidden layers, each hidden layer having four dimensions.

10. The method of claim 1, wherein the output of the residue neural network is weighted by a hyperparameter to modify the first color value.

11. The method of claim 1, wherein the second color value $$C_{ij}^{1}$$

for a pixel i,j in the second frame is determined by $$C_{ij}^{1} = C_{ij}^{0} + \alpha \cdot MLP(\overrightarrow{\nabla x}), \text{ where } C_{ij}^{0}$$

represents the first color value of a corresponding pixel in the first frame, $MLP(\overrightarrow{\nabla x})$ represents the output of the trained residue neural network MLP, $\overrightarrow{\nabla x}$ represents the feature-map difference and the pose difference, and $\alpha$ represents an optional hyperparameter that may be equal to or different than 1.

12. The method of claim 1, wherein the residue neural network is trained by minimizing a loss function that is based on, for each of a plurality of pixels in each ground-truth image in a training set of second images, a difference between a second ground-truth color value of the respective pixel predicted by a trained NeRF model and (1) a first ground-truth color value of a corresponding pixel in a corresponding first training image, from a training set of first images, predicted by the trained NeRF model and (2) the output of the residue neural network during training.

13. One or more non-transitory computer readable storage media embodying instructions that are operable when executed by one or more processors to:

determine a first pose of a first camera of a stereoscopic device corresponding to a first eye and a second pose of a second camera of the stereoscopic device corresponding to a second eye;

access, for a first frame to be presented to the first eye, a first feature map comprising a feature vector for each pixel in the first frame;

determine, by a neural radiance field (NeRF) model and based on the first feature map and the first pose, a first color value for each pixel in the first frame;

access, for a second frame to be presented to the second eye, a second feature map comprising a feature vector for each pixel in the second frame;

determine (1) a feature-map difference between the first feature map and the second feature map and (2) a pose difference between the first pose and the second pose;

determine a second color value for each pixel in the second frame by modifying the first color value of a corresponding pixel in the first frame with an output of a trained residue neural network, the output based on (1) the feature-map difference and (2) the pose difference; and provide for presentation the first frame on a first display of the stereoscopic device and the second frame on a second display of the stereoscopic device.

14. The media of claim 13, wherein the stereoscopic device comprises a head-worn device.

15. The media of claim 13, wherein the NeRF model comprises a lightweight NeRF model trained by a larger, trained NeRF model.

16. The media of claim 15, wherein the lightweight NeRF model and the larger NeRF model each comprise a neural network, and wherein a number of parameters of one or more hidden layers of the lightweight NeRF model is less than a number of parameters of one or more hidden layers of the larger NeRF model.

17. The media of claim 16, wherein the lightweight NeRF model is trained by minimizing a loss function that is based on a difference between, for each of a plurality of pixels in each ground-truth image in a training set of images, a color value of that pixel predicted by the lightweight NeRF model and a color value of that pixel predicted by the larger, trained NeRF model.

18. The media of claim 13, wherein the second color value $$C_{ij}^{1}$$

for a pixel i,j in the second frame is determined by $$C_{ij}^{1} = C_{ij}^{0} + \alpha \cdot MLP(\overrightarrow{\nabla x}), \text{ where } C_{ij}^{0}$$

represents the first color value of a corresponding pixel in the first frame, $MLP(\overrightarrow{\nabla x})$ represents the output of the trained residue neural network MLP, $\overrightarrow{\nabla x}$ represents the feature-map difference and the pose difference, and $\alpha$ represents an optional hyperparameter that may be equal to or different than 1.

19. The media of claim 13, wherein the residue neural network is trained by minimizing a loss function that is based on, for each of a plurality of pixels in each ground-truth image in a training set of second images, a difference between a second ground-truth color value of the respective pixel predicted by a trained NeRF model and (1) a first ground-truth color value of a corresponding pixel in a corresponding first training image, from a training set of first images, predicted by the trained NeRF model and (2) the output of the residue neural network during training.

20. A system comprising: one or more non-transitory computer readable storage media embodying instructions; and one or more processors coupled to the storage media and operable to execute the instructions to:

determine a first pose of a first camera of a stereoscopic device corresponding to a first eye and a second pose of a second camera of the stereoscopic device corresponding to a second eye;

access, for a first frame to be presented to the first eye, a first feature map comprising a feature vector for each pixel in the first frame;

determine, by a neural radiance field (NeRF) model and based on the first feature map and the first pose, a first color value for each pixel in the first frame;

access, for a second frame to be presented to the second eye, a second feature map comprising a feature vector for each pixel in the second frame;

determine (1) a feature-map difference between the first feature map and the second feature map and (2) a pose difference between the first pose and the second pose;

determine a second color value for each pixel in the second frame by modifying the first color value of a corresponding pixel in the first frame with an output of a trained residue neural network, the output based on (1) the feature-map difference and (2) the pose difference; and provide for presentation the first frame on a first display of the stereoscopic device and the second frame on a second display of the stereoscopic device.

* * * * *